K. A. LANTAU.
CARBON CLAMP.
No. 549,731. Patented Nov. 12, 1895.
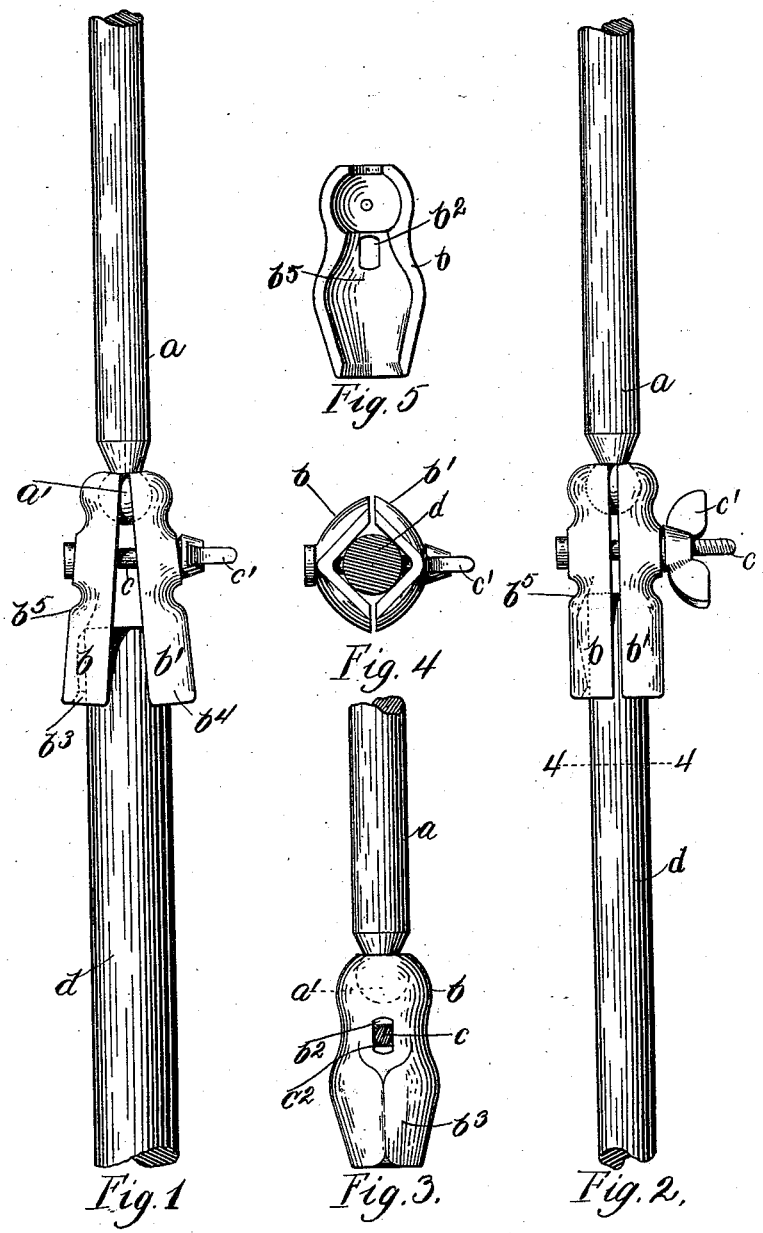
Witnesses:
De Witt C. Tanner
W. Clyde Jones
Inventor,
Karl A. Lantau.
By Barton & Brown
Attorneys

UNITED STATES PATENT OFFICE.

KARL A. LANTAU, OF CHICAGO, ILLINOIS, ASSIGNOR TO THE TURNER BRASS WORKS, OF SAME PLACE.

CARBON-CLAMP.

SPECIFICATION forming part of Letters Patent No. 549,731, dated November 12, 1895.

Application filed April 30, 1895. Serial No. 547,631. (No model.)

*To all whom it may concern:*

Be it known that I, KARL A. LANTAU, a citizen of the United States, residing at Chicago, in the county of Cook and State of Illinois, have invented a certain new and useful Improvement in Carbon-Clamps, (Case No. 2,) of which the following is a full, clear, concise, and exact description, reference being had to the accompanying drawings, forming a part of this specification.

My invention relates to an adjustable carbon-clamp; and its object is primarily to provide a clamp that may be readily adjusted to receive carbons of various diameters, and, furthermore, to combine a clamp thus adjustable with a ball-and-socket joint, whereby the clamp may be adjusted at one operation to bring the carbon into alignment and to clamp the carbon in position regardless of the size of the carbon.

In accordance with my invention in its preferred form I provide a clamp comprising two members, between the ends of which the carbon is adapted to be clamped, a thumbscrew being provided for moving the members toward one another, each of the members being provided with a squared or V-shaped end, whereby the carbon is engaged at four points around the circumference, the jaws being thus capable of clamping carbons of various diameters, each of the members being also provided with a tapering or conical wall, against which the end of the carbon is adapted to rest, the portion of the conical wall engaged by the end of the carbon being determined by the diameter of the carbon. By this construction no matter what may be its diameter within the range of the clamp the carbon is engaged at the extreme end by the conical walls on the two members and at a distance from the end is engaged at four points around the circumference by the squared ends of the two members, thus securely maintaining the carbon in position. The two members comprising the clamp are preferably provided with sockets upon their ends, adapted to engage a ball carried upon the end of the carbon rod, a ball-and-socket joint being thus provided whereby the carbon may be aligned.

I will describe my invention by reference to the accompanying drawings, in which—

Figure 1 is a view in elevation of a carbon-clamp embodying my invention, a large-sized carbon being shown in position. Fig. 2 is a similar view showing a small-sized carbon in position. Fig. 3 is a view of the clamp at right angles to the view of Figs. 1 and 2, a portion of the clamp being shown in section. Fig. 4 is a sectional view on line 4 4, Fig. 2. Fig. 5 is a view in elevation of one of the clamps, illustrating the construction of the clamping-jaw.

Like letters refer to like parts in the several figures.

Upon the end of the carbon rod $a$ is provided a ball $a'$, and the members $b\ b'$ of the clamp are provided in their ends with sockets adapted to engage said ball $a'$. The carbon $d$ is adapted to be clamped between the opposite ends or jaws $b^3\ b^4$ of the members $b\ b'$, and a screw $c$ passes through the members $b\ b'$ at the middle portions, a thumb-nut $c'$ being adapted to screw upon the end of screw $c$, whereby the members may be rotated on the ball $a'$ and their opposite ends brought together to clamp the carbon between the same.

As shown in Fig. 3, the head of the screw $c$ is provided with a square portion $c^2$, adapted to fit a slot $b^2$, provided in one of the members $b$, whereby the rotation of the screw is prevented. The members $b\ b'$ are provided with square ends, as illustrated more clearly in Figs. 4 and 5, the ends of the jaws being thus of V shape, whereby when the carbon is clamped between the jaws the carbon is engaged at four points around its circumference. Thus no matter what may be the diameter of the carbon within the range of the clamp the carbon will be engaged at four points around the periphery. Upon each of the members of the clamp at the rear of the clamping face or jaw is provided a tapering or conical surface $b^5$, against which the end of the carbon is adapted to rest.

When the carbon is placed in the clamp, it is thrust up against the conical walls $b^5$, and as the members are moved toward one another the carbon is gradually thrust downward until the squared ends of the jaws come in contact with the sides of the carbon, the end of the carbon being thus clamped between portions of the conical surfaces corresponding to the diameter of the carbon.

In Figs. 1 and 2 I have indicated in dotted lines the conical wall upon the member $b$ of the clamp, and when, as illustrated in Fig. 1, the carbon is of a large diameter the end of the carbon will engage the conical wall $b^5$ at a point below that at which the end of a small carbon, as illustrated in Fig. 2, will engage the wall. Thus when the members of the clamp are moved together the carbon assumes a position in which its extreme end is clamped between the conical walls $b^5$, provided upon the members, and the sides of the carbon are clamped at a distance from the end between the V-shaped jaws.

While I have illustrated my invention in connection with a ball-and-socket joint between the clamp and the carbon rod, which construction is preferred, the feature of my invention whereby the clamp is adjustable to carbons of different diameters may be employed independently of the ball-and-socket joint, and I do not limit myself in this particular. Furthermore, while I have illustrated the conical walls at the rear of the clamping-faces as employed in connection with jaws having squared or V-shaped ends, it will appear that this feature of my invention may be used independently of the V-shaped jaws, though not with the best results, and I do not limit myself in this particular.

I am aware that it has been proposed heretofore to form a carbon-clamp of two members, between which a ball upon the carbon rod is adapted to be clamped at one end, while the end of the carbon is adapted to be clamped between the opposite ends of the two members, and I disclaim this feature in its individual capacity.

Having described my invention, what I claim as new, and desire to secure by Letters Patent, is—

1. In a carbon clamp, the combination with two members adapted to be moved toward one another to clamp the carbon between the same, of tapering or conical walls provided upon said members adapted to engage and clamp the extreme end of the carbon, and jaws provided upon said members and adapted to tangentially engage the sides of the carbon at a distance from the end thereof; substantially as described.

2. In a carbon clamp, the combination with two members, pivoted to rotate about one end and adapted to clamp the carbon between the opposite ends, of squared or V shaped jaws, provided at the ends of said members, adapted to engage the sides of the carbon at four points around the circumference, and tapering or conical walls provided upon said members against which the extreme end of the carbon is adapted to abut, whereby the carbon is clamped at the extreme end between the conical walls and is engaged at four points around the circumference by the V shaped jaws, and the clamp is readily adjustable to carbons of different diameters; substantially as described.

3. The combination with a carbon rod carrying a ball upon its end, of a carbon clamp comprising two members, provided at one end with sockets in which said ball is adapted to fit, and between the opposite ends of which the carbon is adapted to be clamped, a thumb screw passing through the intermediate portions of said members, said members being provided at the end with squared or V shaped jaws adapted to engage the sides of the carbon at four points around the circumference, said members being also provided with tapering or conical walls, against which the end of the carbon is adapted to abut, whereby the carbon may be aligned and the clamp may be readily adjustable to carbons of different diameters; substantially as described.

In witness whereof I hereunto subscribe my name this 12th day of April, A. D. 1895.

KARL A. LANTAU.

Witnesses:
    JOHN W. SINCLAIR,
    W. CLYDE JONES.